May 27, 1930.　　　　A. J. AMSLER　　　　1,760,033
MACHINE FOR GENERATING TORSIONAL MOMENTS,
PARTICULARLY FOR TESTING PURPOSES
Filed May 20, 1929　　　2 Sheets-Sheet 1
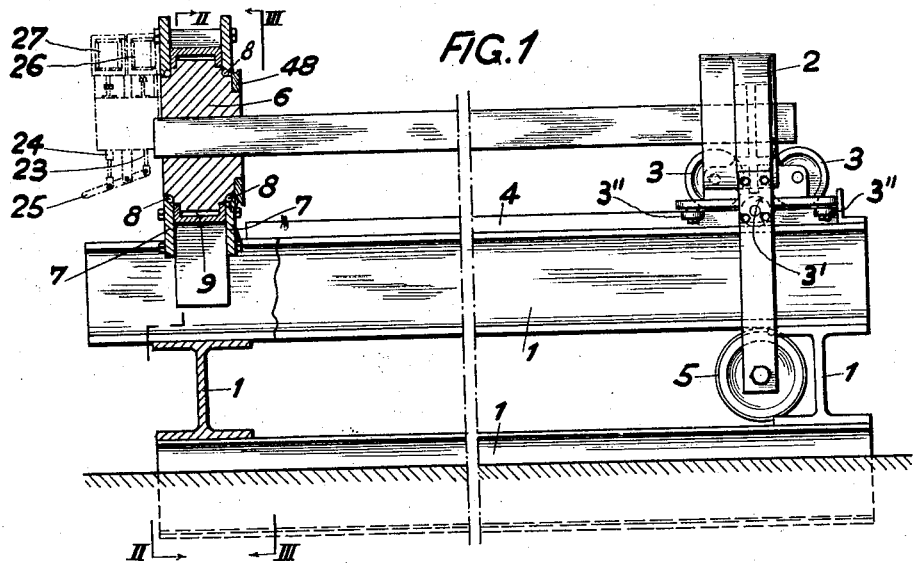
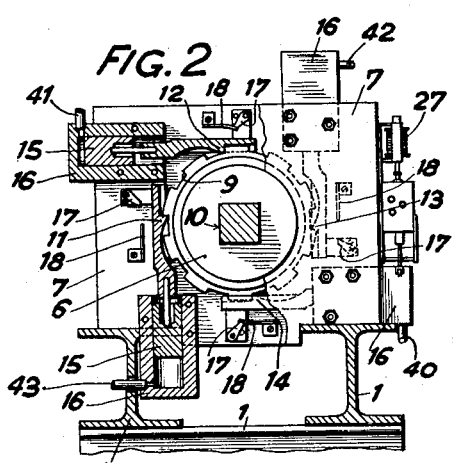
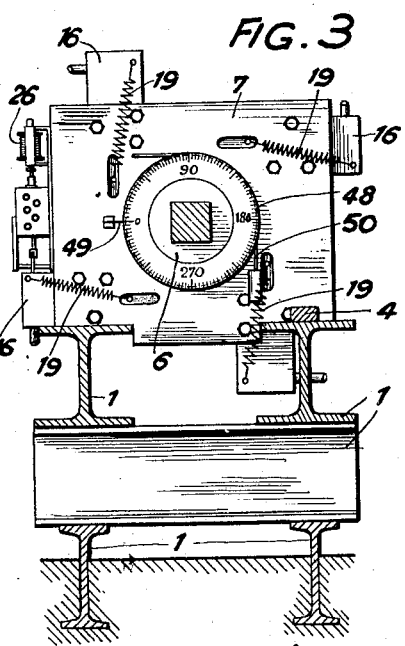
INVENTOR:
Alfred J. Amsler.
By Henry Orth
Atty

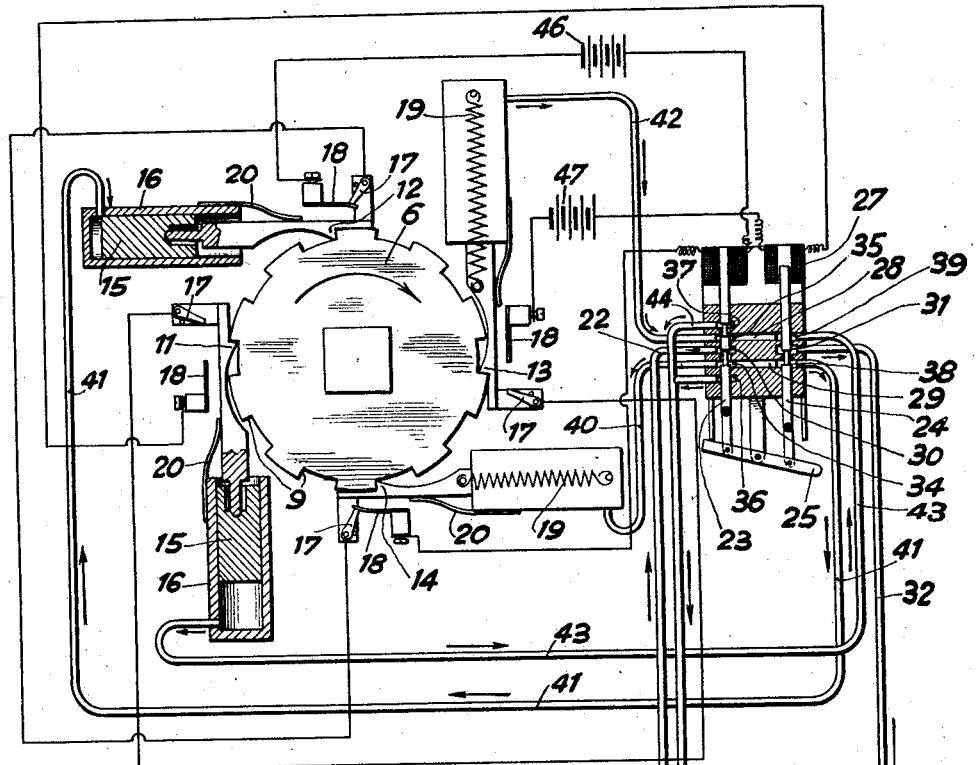
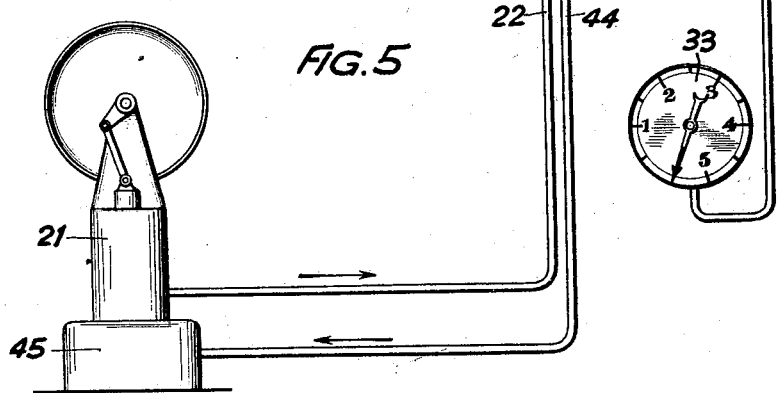
FIG.5
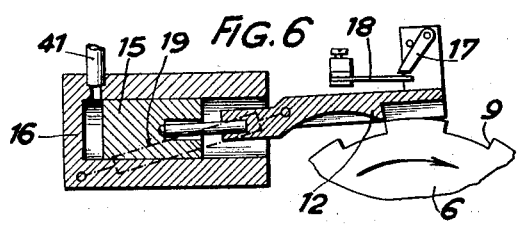
INVENTOR:
Alfred J. Amsler
By Henry Ortt
Atty Patented May 27, 1930

1,760,033

UNITED STATES PATENT OFFICE

ALFRED J. AMSLER, OF SCHAFFHAUSEN, SWITZERLAND

MACHINE FOR GENERATING TORSIONAL MOMENTS, PARTICULARLY FOR TESTING PURPOSES

Application filed May 20, 1929, Serial No. 364,622, and in Germany April 16, 1929.

Machines for generating torsional moments, particularly for testing purposes, are known, which are provided with two rotatable chucks for gripping the test bar, one of said chucks being turned by means of a worm gear or the like to apply a torque to the test bar, whilst the other serves for measuring the torsional moment exerted. The main drawbacks inherent to such machines are the low efficiency of the worm gear and the arrangement of the means for the application of the torque and for measuring the latter at different ends of the machine, which is particularly inconvenient with heavy testing machines for test bars of very different lengths.

These drawbacks are eliminated in the machine according to the invention, in that the one of the two chucks is nonrotatably arranged on the bed of the machine but adapted to be displaced thereon in the direction of the bar, whilst the other chuck is rotatably arranged and provided with a driving gear of such a design as to yield the highest possible efficiency and to enable the torsional moment exerted to be measured exactly. For this purpose the rotatable chuck is provided with a toothed rim which cooperates with tangential pawls actuated by hydraulic presspots, whereby the pressure of the fluid in the presspots, which is indicated on pressure gauges, is proportional to the torsional moment exerted on the chucked test bar.

In the drawing a machine, embodying the invention, is shown, by way of example only, in which:

Fig. 1 is an elevation of the machine with parts shown in section;

Fig. 2 is partly an end elevation of the rotatable chuck, seen from outside, and partly a section on the line II—II in Fig. 1;

Fig. 3 is a section on the line III—III in Fig. 1;

Fig. 4 is an end elevation of the non-rotatable chuck;

Fig. 5 shows in a diagrammatic manner means for generating the turning movement of the rotatable chuck, and Fig. 6 shows a detail.

The machine illustrated is provided with a bed 1 fixed to the floor. Along the bed 1 the non-rotatable chuck 2 is displaceable and for this purpose, it is constructed in the manner of a carriage having wheels 3, adapted to run on a rail 4, fixed to one of the beams forming part of the bed 1, and a wheel 5 running on the lower flange of a further longitudinal beam forming part of the bed. The rollers 3 and 5 serve to transmit the torsional forces acting on the test piece to the bed 1. A small roller 3' running on the upper flange of the beam and four rollers 3'' bearing on the lateral faces of the rail 4 secure the proper position of the non-rotatable chuck during the displacement along the bed. The rotatable chuck 6 is mounted at the one end of the bed 1. The said chuck is rotatable in between two plates 7 forming races of ball bearings 8 and is provided on its periphery with a toothed rim 9. A rectangular hole 10 arranged in its centre portion serves for receiving the test bar.

Four pawls 11, 12, 13 and 14 engage with the teeth of the rim 9 and are arranged in pairs of two diametrically opposed pawls in such a manner that they are all adapted to exert a pushing action on the toothed rim, in the same direction of rotation. Each pawl is linked to a piston 15 of one of the presspots 16 and all the pistons 15 are of the same size and move in the cylinders 16 without any substantial friction. On each pawl an abutment member 17 is mounted, which cooperates with a contact spring 18 when the piston 15, under the influence of the spring 19, is forced into its innermost position. A spring 20 (Fig. 5) presses the pawl in engagement with the toothed rim 9. The same effect is obtained by arranging the springs 19 at an angle to the axis of the piston as is indicated in Fig. 3. When liquid is admitted to a hydraulic cylinder 16, the piston 15 is forced outwards and consequently the respective pawl advances the rotatable chuck.

The presspots are controlled in such a manner (see Fig. 5) that at any time two opposite pawls are simultaneously operative. Pressure liquid is supplied by the pump 21 and is passed through a conduit 22 to a first control valve 23, beside which a second control valve 24 is arranged, which latter is connected to the first control valve by means of a two armed lever 25. A solenoid 26 influences the control valve 23 and a solenoid 27 influences the control valve 24, but the arrangement is such that both control valves are simultaneously displaced by each one of the two separate solenoids. The two control valves are interconnected by passages 28 and 29. The pressure liquid is admitted to a central annular space 30 of the control valve 23 by way of a conduit 22, and a corresponding annular space 31 of the control valve 24 is connected with a pressure gauge 33 through a conduit 32. Adjacent to the annular space 30 the annular spaces 34 and 35 are arranged, and beyond the same the annular spaces 36 and 37. The annular spaces 34 and 35 communicate with their corresponding annular spaces 38 and 39 of the control valve 24 by way of the passages 29 and 28. The annular space 34 is connected with a pipe 40 which leads to the presspot associated with the pawl 14, whilst the pipe 41 connected with the corresponding annular space 38 leads to the presspot of the opposite pawl 16. The annular space 35 communicates with the cylinder of the pawl 13 through the conduit 42 and the annular space 39 communicates with the cylinder of the opposite pawl 11 by way of conduit 43. The annular spaces 36 and 37 are connected with a conduit 44, which leads to the liquid reservoir 45 of the pump 21.

In the position of the valve pistons 23 and 24, shown in Fig. 5, pressure liquid is fed to the diametrically opposite pusher pawls 12 and 14, whereupon the latter operate to turn the toothed rim. In the innermost position of the pistons the abutment members 17 hit on the contact springs 18 as soon as the pawls, during the rotation of the toothed rim, drop off the edge of the corresponding tooth into the tooth space. Fig. 6 shows the positions of the abutment member 17 and the contact spring 18 immediately before the pawl drops into the tooth space of the toothed rim 12. The terminals of the two diametrically opposed pawls 12 and 14 or 11 and 13 respectively are connected in series in their respective circuits so that the latter are closed. Consequently, the corresponding solenoids are actuated only after both cooperating pawls have dropped off the corresponding teeth of the toothed rim. The pawls 11 and 13 are moved back into their innermost positions by action of the springs 19, thereby discharging the liquid from the presspots 16 through the conduits 42, 43 and 44 into the reservoir 45. Thus, these pawls are moved into engagement with the next tooth 9, on the chuck 6, the parts 17 and 18 contact with each other and the control apparatus is automatically reversed, whereupon the pawls 11 and 13 are effective to continue the rotation of the chuck, whilst the pawls 12 and 14 return into their innermost positions.

The pistons of the presspots are all of the same diameter and the driving impulse is imparted to the teeth 9 in the tangential direction of the rim. Therefore, the oppositely disposed pawls exert a clear torsional moment on the rotatable chuck, which is equal to the pressure of the two pistons multiplied by the diameter of the circle of the toothed rim in which the pawls act. As no frictional resistance of any practical importance occurs during the rotation of the chuck, the liquid pressure acting in the hydraulic cylinders is proportional to the torsional moment and the latter is therefore obtainable with great accuracy by the readings on the dial of the pressure gauge 33. When the pressure liquid is pressed into the cylinders with uniform velocity by the pump, the chuck 6 is turned at a uniform rate of speed. Each time during the change in the operative engagement between the two pairs of pawls a short period of rest occurs which, however, due to its small duration, has no disturbing effect.

The angular displacement through which the chuck 6 rotates is equal to the angle of torsion of the test body. The circular scale 48 (Figs. 1 and 3), concentrically arranged on the rotatable chuck 6, serves for reading off the said angle by the aid of a stationary pointer 49. Alternatively, a tension member 50 may be wound on the circumference of the circular scale 48 which may be operatively connected with a recording drum for diagrammatically illustrating the angle of torsion in a manner well known in the art.

The control device may also be hand-operated by means of a lever 25, that is to say, moved into a neutral position when, for instance, it is not desired to strain a test bar until it breaks but to relieve it again from the torque.

I claim:

1. In a device for generating torsional moments, particularly for testing purposes, a rotatable and a non-rotatable chuck for gripping the test piece to be subjected to torsion, a toothed rim provided on said rotatable chuck, pawls cooperating with said toothed rim and exerting a tangential force on the latter, hydraulic presspots for operating said pawls, and means to determine the hydraulic pressure which is proportional to the torsional moment exerted on the test piece.

2. In a device for generating torsional moments, particularly for testing purposes, a rotatable and non-rotatable chuck for gripping the test piece to be subjected to torsion, a toothed rim provided on said rotatable chuck, an even number of pawls arranged in pairs diametrically opposite each other and one pair after the other cooperating with said toothed rim tangentially to the latter, hydraulic presspots of equal force acting on said pawls, and means to determine the hydraulic pressure which is proportional to the torsional moment exerted on the test piece.

3. In a device for generating torsional moments, particularly for testing purposes, a rotatable and a non-rotatable chuck for gripping the test piece to be subjected to torsion, a toothed rim provided on said rotatable chuck, an even number of pawls arranged in pairs diametrically opposite each other and one pair after the other cooperating with said toothed rim tangentially to the latter, mechanical means to return the inoperative pawls into their initial position, hydraulic presspots of equal force acting on said pawls, and means to determine the hydraulic pressure which is proportional to the torsional moment exerted on the test piece.

4. In a device for generating torsional moments particularly for testing purposes, a rotatable and a non-rotatable chuck for gripping the test piece to be subjected to torsion, a toothed rim provided on said rotatable chuck, an even number of pawls arranged in pairs diametrically opposite each other and one pair after the other cooperating with said toothed rim tangentially to the latter, spring means to return the inoperative pawls into their initial position, hydraulic presspots of equal force acting on said pawls, means to determine the hydraulic pressure which is proportional to the torsional moment exerted on the test piece, and means to control the admission and discharge of the pressure liquid to and from said presspots, which means include two control valves, electromagnets adapted to operate said valves, contacts on said pawls cooperating with stationary contacts when said pawls enter a tooth space of said toothed rim, and independent electric circuits in which the contact means of every pair of pawls are arranged in series.

5. In a device for generating torsional moments, particularly for testing purposes, a rotatable and a non-rotatable chuck for gripping the test piece to be subjected to torsion, a toothed rim provided on said rotatable chuck, four pawls equally spaced around said toothed rim and cooperating with the latter by exerting a tangential force, the pairs of two diametrically opposite pawls acting in succession, four hydraulic presspots of equal force acting on said four pawls, means to determine the hydraulic pressure which is proportional to the torsional moment exerted on the test piece, spring means to return the inoperative pawls into their initial position, and means to control the admission and discharge of the pressure liquid to and from said presspots, which means include two control valves, electromagnets adapted to operate said valves, contacts on said pawls cooperating with stationary contacts when said pawls enter a tooth space of said toothed rim, and independent electric circuits in which the contact means of every pair of pawls are arranged in series.

In testimony whereof I have signed my name to this specification.

ALFRED J. AMSLER.